(12) United States Patent
Manbo et al.

(10) Patent No.: US 8,537,765 B2
(45) Date of Patent: Sep. 17, 2013

(54) METHODS AND NODES IN A WIRELESS COMMUNICATION SYSTEM

(75) Inventors: Olof Manbo, Linköping (SE); Hákan Eric Axelsson, Linköping (SE); Andreas Stig Bergström, Vikingstad (SE); Mats Bertil Karlsson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 421 days.

(21) Appl. No.: 12/946,383

(22) Filed: Nov. 15, 2010

(65) Prior Publication Data

US 2011/0200019 A1   Aug. 18, 2011

Related U.S. Application Data

(60) Provisional application No. 61/305,220, filed on Feb. 17, 2010.

(51) Int. Cl.
*H04W 74/00* (2009.01)

(52) U.S. Cl.
USPC .............................. 370/329; 370/336; 370/337

(58) Field of Classification Search
None
See application file for complete search history.

(56) References Cited

U.S. PATENT DOCUMENTS

| | | | |
|---|---|---|---|
| 7,620,021 B1* | 11/2009 | Chen et al. | 370/337 |
| 7,957,418 B2* | 6/2011 | Wijayanathan et al. | 370/468 |
| 2008/0259880 A1* | 10/2008 | Parolari et al. | 370/337 |
| 2011/0002231 A1* | 1/2011 | Hole et al. | 370/252 |

FOREIGN PATENT DOCUMENTS

| | | |
|---|---|---|
| WO | 01/20924 A1 | 3/2001 |
| WO | 2008/041941 A1 | 4/2008 |
| WO | 2009/102252 A1 | 8/2009 |
| WO | 2009/134195 A1 | 11/2009 |

OTHER PUBLICATIONS

"Summary on EFTA"; May 2009; 3GPP TSG GERAN #42; GP-090681; pp. 1-5.*
3rd Generation Partnership Project. "Enhanced Flexible Timeslot Assignment." 3GPP TSG GERAN#40, Tdoc GP-081901, Agenda Item 7.1.5.16, Miami, FL, USA, Nov. 17-21, 2008.
3rd Generation Partnership Project. 3GPP TS 44.060, V9.2.0 (Dec. 2009), 3rd Generation Partnership Project; Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 9), Dec. 2009.

* cited by examiner

*Primary Examiner* — Robert Scheibel
(74) *Attorney, Agent, or Firm* — Coats & Bennett, P.L.L.C.

(57) ABSTRACT

Embodiments herein include a network node and a mobile station in a wireless communication system. Embodiments also include a method in the mobile station and a method in the network node. With particular regard to the method in the network node, the method schedules wireless transmissions between the network node and the mobile station. The method comprises obtaining a multi-slot class of the mobile station and determining a downlink Temporary Block Flow configuration. Further, the method comprises assigning uplink timeslots to the mobile station and associating each assigned uplink timeslot with a priority value, based on the downlink Temporary Block Flow configuration and the multi-slot class of the mobile station.

18 Claims, 7 Drawing Sheets

METHODS AND NODES IN A WIRELESS COMMUNICATION SYSTEM

RELATED APPLICATIONS

This application claims priority to U.S. Provisional Patent Application Ser. No. 61/305,220 filed Feb. 17, 2010, which is incorporated herein by reference in its entirety.

TECHNICAL FIELD

The present disclosure relates to a network node, a method in a network node, a mobile station and a method in a mobile station. Particularly, it relates to scheduling of wireless transmissions in a wireless communication system.

BACKGROUND

Mobile stations, also known as mobile terminals, wireless terminals and/or user equipments (UE) are enabled to communicate wirelessly in a wireless communication system, sometimes also referred to as a cellular radio system. The communication may be made e.g. between two mobile stations, between a mobile station and a regular telephone and/or between a mobile station and a server via a Radio Access Network (RAN) and possibly one or more core networks.

The mobile stations may further be referred to as mobile telephones, cellular telephones, laptops with wireless capability. The mobile stations in the present context may be, for example, portable, pocket-storable, hand-held, computer-comprised, or vehicle-mounted mobile devices, enabled to communicate voice and/or data, via the radio access network, with another entity, such as another mobile station or a server.

The wireless communication system covers a geographical area which is divided into cell areas, with each cell area being served by a base station, e.g. a Radio Base Station (RBS), which in some networks may be referred to as "eNB", "eNodeB", "NodeB" or "B node", depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. The base stations communicate over the air interface operating on radio frequencies with the mobile stations within range of the base stations.

In some radio access networks, several base stations may be connected, e.g. by landlines or microwave, to a Radio Network Controller (RNC) e.g. in Universal Mobile Telecommunications System (UMTS). The RNC, also sometimes termed a Base Station Controller (BSC) e.g. in GSM, may supervise and coordinate various activities of the plural base stations connected thereto. GSM is an abbreviation for Global System for Mobile Communications (originally: Groupe Special Mobile).

In 3rd Generation Partnership Project (3GPP) Long Term Evolution (LTE), base stations, which may be referred to as eNodeBs or even eNBs, may be connected to a gateway e.g. a radio access gateway. The radio network controllers may be connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for mobile stations. The 3GPP has undertaken to evolve further the UTRAN and GSM based radio access network technologies.

According to 3GPP/GERAN, a mobile station has a multi-slot class, which determines the maximum transfer rate in the uplink and downlink direction. GERAN is an abbreviation for GSM EDGE Radio Access Network. EDGE is further an abbreviation for Enhanced Data rates for GSM Evolution.

In the present context, the expression downlink is used for the transmission path from the base station to the mobile station. The expression uplink is used for the transmission path in the opposite direction i.e. from the mobile station to the base station.

A maximum downlink and uplink rate may, for many multi-slot classes, not be reached simultaneously due to the nature of the specified multi-slot classes. The GERAN has to decide which direction to prioritize, uplink or downlink, and give the maximum bandwidth to either uplink or downlink, not to both at the same time.

The transmission of signals between a mobile station and a base station may be made on a carrier. A frame is subdivided into timeslots, which may be allocated for either uplink or downlink transmission.

An algorithm to determine the main direction of the data flow, i.e. uplink or downlink of a packet based session may be utilized. However in many cases the algorithm cannot be fast enough to fully utilize the bandwidth according to the multi-slot capability of the mobile station. Many interactive packet switched services require uploads and downloads of data, but not simultaneously. The services may be interactive in the sense that an upload is responded by a download and vice versa. Such fast shift in bandwidth demands, from uplink to downlink and vice versa, is made possible with Enhanced Flexible Timeslot Assignment (EFTA), which was comprised in 3GPP/GERAN Release-9. EFTA makes a full utilization of the bandwidth possible, and provide thereby a more efficient packet switched service. Another feature that is made possible with EFTA is the support and use of more than 5 timeslots per carrier for a mobile station and direction, downlink and uplink. Without EFTA, this is not possible in practice today, since support for "Type 2" mobile stations is considered very complex and expensive to implement in mobile stations.

In order to provide required data bandwidth, several carriers may be used in a process called carrier aggregation. A type 1 system and a type 2 system are classified according to whether carrier aggregation is used. By using carrier aggregation, several carriers are aggregated on the physical layer to provide the required bandwidth.

A shared component carrier is used for both a type 1 mobile station and a type 2 mobile station, whereas a dedicated component carrier is used only for the type 2 mobile station. Also, a type 2 base station transmits broadcast information by using a shared component carrier. In this instance, the broadcast information comprises the shared broadcast information used for both the type 1 mobile station and the type 2 mobile station and the dedicated broadcast information only for the type 2 mobile station. Additionally, the type 2 base station indicates component carriers that are used by the type 2 mobile station, by using a semi-static component carrier indicator or a dynamic component carrier indicator.

When more than 5 timeslots are supported and used e.g. within an EFTA system, uplink and downlink blocks have the risk of "colliding", i.e. that timeslots are allocated both for uplink and downlink communication at the same time. Since uplink is prioritized with EFTA, downlink blocks will in such case be lost and need to be re-transmitted. The probability of "collision" is higher or lower depending on chosen Temporary Block Flow (TBF) configuration. It is up to the EFTA Channel Utilisation function to determine the TBF configuration with a number of inputs.

The problem with the existing solution is that since the uplink is prioritized and the uplink scheduling order is predefined, i.e. built into EFTA, some TBF configurations will perform considerably worse than other configurations, in the sense that more collisions between uplink and downlink will occur and thus more retransmissions in downlink have to be made.

When using less than 8 timeslots downlink (per carrier), some uplink timeslots will destroy more downlink timeslots than others. When using 8 timeslots downlink (per carrier), some uplink timeslots will destroy more important downlink timeslots than others. Which uplink timeslots that destroys downlink timeslots depend on which timeslots are assigned to the downlink and uplink TBFs.

One method of finding the best possible TBF configuration for EFTA would be to evaluate every possible alternative at every occasion when EFTA TBF is to be assigned. This would however consume a lot of processing power in the base station where the algorithm is implemented. It may also be more time consuming and lead to a general performance degradation within the wireless communication system.

Another solution would be to prohibit the support and use of more than 5 timeslots per carrier for a terminal and direction, downlink and uplink. However, since the uplink typically may not use all assigned timeslots every Transmission Time Interval (TTI), setting restrictions on timeslot reservations would severely affect performance, leading to low utilization of available resources.

Also, the switching time, for switching between receiving and transmitting in uplink/downlink respectively will affect the performance of the method to find the best possible TBF configuration within the wireless communication system resulting in better or worse communication delay.

SUMMARY

It is an object to obviate at least some of the above disadvantages and provide an improved performance within a wireless communication system.

According to a first aspect, the object is achieved by a method in a network node. The method aims at scheduling wireless transmissions between the network node and a mobile station. The method comprises obtaining a multi-slot class of the mobile station. Further the downlink Temporary Block Flow configuration is determined. Then, based on the downlink Temporary Block Flow configuration and the multi-slot class of the mobile station, each uplink timeslot is associated with a priority value and assigned to the mobile station.

According to a second aspect, the object is achieved by a network node for scheduling wireless transmissions between the network node and a mobile station. The network node comprises a processing circuit, configured to determine a downlink Temporary Block Flow configuration, to obtain a multi-slot class of the mobile station, and to assign uplink timeslots to the mobile station and associating each assigned uplink timeslot with a priority value, based on the downlink Temporary Block Flow configuration and the multi-slot class of the mobile station.

According to a third aspect, the object is achieved by a method in a mobile station. The method aims at scheduling order for timeslots in uplink transmission of data to a network node. The method comprises receiving an uplink assignment from the network node. Further, the method also comprises selecting the order in which timeslots are to be scheduled for uplink transmission, based on an algorithm using the lowest numbered downlink timeslot the mobile station needs to monitor, and the switching time from transmission to reception of the mobile station, as parameters. In addition, the method comprises transmitting uplink data in the selected timeslot order, to be received by the network node. The uplink data is transmitted until there are either no more assigned timeslots available, or no more data to transmit, such that the assigned timeslots that are redundant are not used for uplink transmission.

According to a fourth aspect, the object is achieved by a mobile station, configured to select scheduling order for timeslots in uplink transmission of data to a network node. The mobile station comprises a receiver. The receiver is configured for receiving an uplink assignment from the network node. Also, the mobile station in addition comprises a processing circuit. The processing circuit is configured for selecting the order in which timeslots are to be scheduled for uplink transmission, based on an algorithm using the lowest numbered downlink timeslot the mobile station needs to monitor, and the switching time from transmission to reception of the mobile station, as parameters. Further, the mobile station also comprises a transmitter. The transmitter is configured to transmit uplink data in the selected timeslot order, to be received by the network node. The uplink data is transmitted until there are either no more assigned timeslots available, or no more data to transmit, such that the assigned timeslots that are redundant are not used for uplink transmission.

Embodiments of the present methods and nodes determine the uplink timeslot configuration to be utilized, which simplifies selection of a better, a somewhat improved, or even the optimal configuration. Since embodiments of the present methods have only two input values, it is feasible to implement all combinations e.g. in pre-defined selection tables, look-up tables. This makes it deterministic and fast to select the configuration. Thereby an improved performance within the wireless communication system is provided.

Other objects, advantages and novel features will become apparent from the following detailed description.

BRIEF DESCRIPTION OF THE DRAWINGS

The solution is described in more detail with reference to attached drawings illustrating exemplary embodiments and in which.

DETAILED DESCRIPTION

Embodiments herein include a method in a network node, a network node, a method in a mobile station and a mobile station in a wireless communication system. These specific embodiments however should not be considered limiting; rather, the embodiments are provided merely as examples so that this disclosure will be thorough.

For example, other features and advantages of the embodiments may become apparent from the following detailed description considered in conjunction with the accompanying drawings. It is to be understood that the drawings are designed solely for purposes of illustration and not as a definition of the limits of the present invention. It is further to be understood that the drawings are not necessarily drawn to scale and that, unless otherwise indicated, they are merely intended to conceptually illustrate the structures and procedures described herein.

Figure 1:
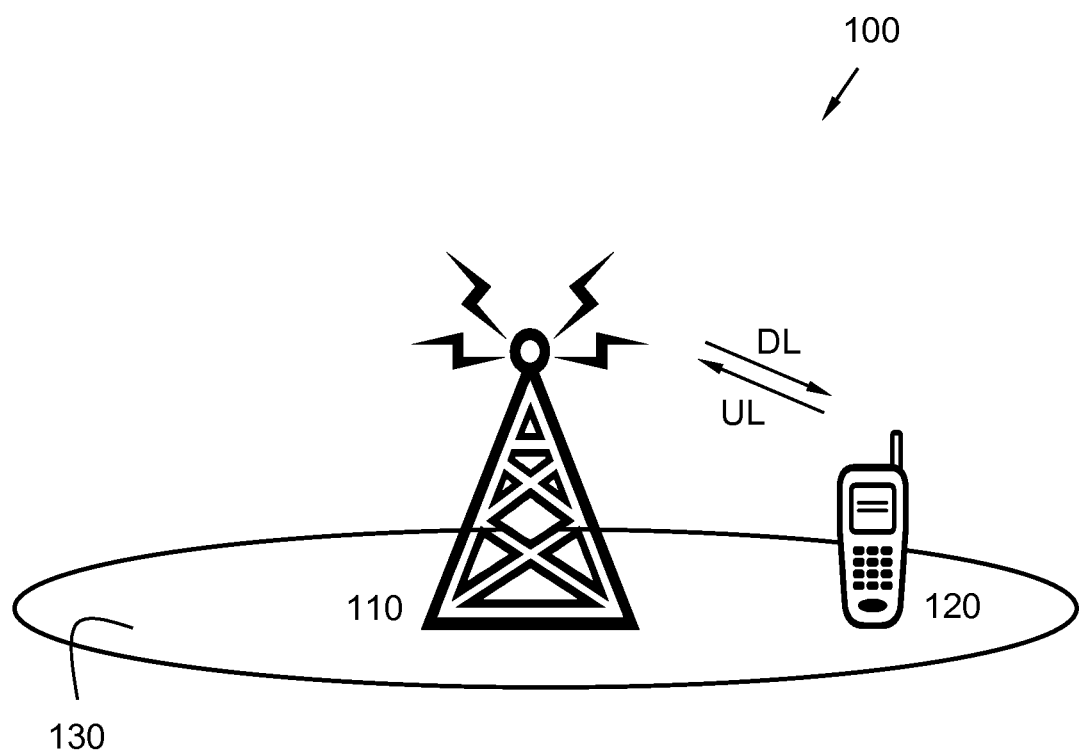
FIG. 1 is a schematic block diagram illustrating a wireless communication system according to some embodiments.

FIG. 1 depicts a wireless communication system 100, such as e.g. 3GPP LTE, LTE-Advanced, UTRAN, Evolved UTRAN (E-UTRAN), UMTS, GSM/EDGE, GERAN, WCDMA, Time Division Multiple Access (TDMA), Worldwide Interoperability for Microwave Access (WiMax), or Ultra Mobile Broadband (UMB), just to mention some few options.

The wireless communication system 100 may be configured to operate according to the Time Division Duplex (TDD) and/or the Frequency Division Duplex (FDD) principle, according to different embodiments.

TDD is an application of time-division multiplexing to separate uplink and downlink signals in time, possibly with a guard period situated in the time domain between the uplink and downlink signalling. FDD means that the transmitter and receiver operate at different carrier frequencies.

The purpose of the illustration in FIG. 1 is to provide a general overview of the present methods and the functionalities involved. The present methods and nodes will as a non-limiting example be described in a 3GPP/GERAN environment.

The wireless communication system 100 comprises a network node 110, and a mobile station 120, arranged to communicate with each other. The mobile station 120 is situated in a cell 130, defined by the network node 110. The mobile station 120 is configured to transmit radio signals comprising information data to be received by the network node 110. Contrariwise, the mobile station 120 is configured to receive radio signals comprising information data transmitted by the network node 110.

It is to be noted that the illustrated setting of network nodes 110 and mobile stations 120 in FIG. 1 is to be regarded as a non-limiting exemplary embodiment only. The wireless communication network 100 may comprise any other number and/or combination of network nodes 110 and or mobile stations 120.

The network node 110 may be referred to as e.g. base station, NodeB, evolved Node B (eNB, or eNode B), base transceiver station, Access Point Base Station, base station router, Radio Base Station (RBS), macro base station, micro base station, pico base station, femto base station, Home eNodeB, relay and/or repeater, sensor, beacon device or any other network node configured for communication with the mobile station 120 over a wireless interface, depending e.g. of the radio access technology and terminology used. In the rest of the disclosure, the term "network node" will be used for the network node 110, in order to facilitate the comprehension of the present methods.

The mobile station 120 may be represented by e.g. a wireless communication terminal, a mobile cellular phone, a Personal Digital Assistant (PDA), a wireless platform, a user equipment unit (UE), a portable communication device, a laptop, a computer or any other kind of device configured to communicate wirelessly with the network node 110.

The network node 110 controls the radio resource management within the cell 130, such as e.g. allocating radio resources to the mobile station 120 within the cell 130 and ensuring reliable wireless communication links between the network node 110 and the mobile station 120.

According to various embodiments herein, uplink timeslots are treated with different importance (or weight or priority) depending on the downlink TBF's timeslot configuration and the multi-slot class of the mobile stations 120.

Moreover, the specified uplink scheduling order is enhanced in order to further improve the timeslot utilization using EFTA. Thus all timeslots are not considered as equally important when it comes to TBF configuration, based on the uplink scheduling order and a determined downlink scheduler.

Figure 2:
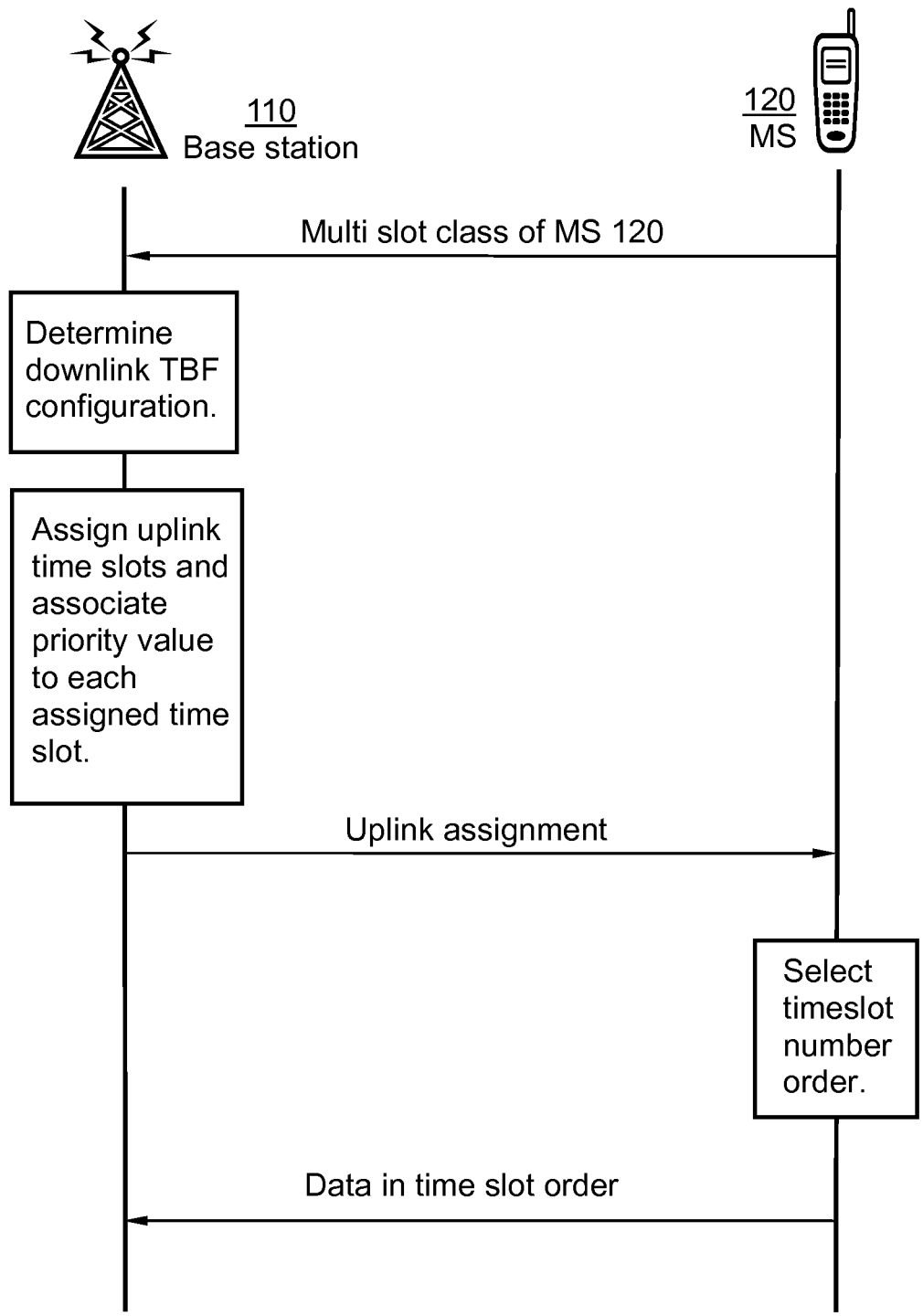
FIG. 2 is a combined block diagram and flow chart illustrating an exemplary embodiment within a wireless communication system.

FIG. 2 is a combined block diagram and flow chart illustrating an embodiment within the wireless communication system 100. The method aims at scheduling wireless transmissions between the network node 110 and the mobile station 120.

The method may comprise a number of actions, in order to efficiently perform the scheduling in the wireless communication system 100. The actions may be performed in a somewhat different order than the herein utilised order of appearance, which is merely exemplary according to different embodiments.

The network node 110 obtains the multi-slot class of the mobile station 120, which is to be scheduled. The network node 110 may according to some embodiments send a request, triggering the mobile station 120 to provide the multi-slot class of the mobile station 120. The multi-slot class of the mobile station 120 may be previously obtained and stored e.g. in a memory, database or any other data storage unit.

Further, the downlink Temporary Block Flow configuration to be utilized is determined by the network node 110.

The network node 110 may then assign uplink timeslots to the mobile station 120 and associate each assigned uplink timeslot with a priority value, based on the downlink Temporary Block Flow configuration and the multi-slot class of the mobile station 120.

The uplink assignment may then be sent to the mobile station 120. The mobile station 120 may, when receiving the uplink assignment, select the timeslot number order. The timeslot number order to be used for transmission may be selected based on an algorithm using the lowest numbered downlink timeslot the mobile station 120 needs to monitor, and the switching time from transmission to reception of the mobile station 120 as parameters. The uplink data may then be transmitted in the selected timeslot number order.

The order in which timeslots are selected for uplink transmission may comprise selecting the order of the timeslot numbers from a look-up table, according to some embodiments.

The following assumptions render it possible to have a Channel Utilization function with a method which according to some embodiments may improve the performance for the packet session:

1. a given downlink TBF's timeslot configuration
2. a downlink scheduler working in a pre-defined way
3. an uplink scheduler which transmits uplink blocks in a given timeslot order.

Advantages according to some embodiments may comprise:

Firstly, since the downlink TBF is taken into consideration, the order of timeslots may be chosen in an improved way.

Secondly, reservations with 6, 7 or 8 uplink timeslots may take advantage of having the uplink timeslots sent in a consecutive way. Thereby is the number of direction changes between uplink and downlink minimized, or at least somewhat reduced, leading to an improved system performance.

Thirdly, when 4 or less timeslots are used, the uplink may be placed in consideration to the downlink, as different uplink timeslots are given different priority, depending on the downlink TBF's timeslot configuration and the multi-slot class of the mobile stations 120.

Fourthly, the applied switching time may be considered in the uplink scheduling order, which render an improved system performance.

The channel utilization function may according to some embodiments use a method which minimizes, or at least reduces the number of "collisions" between uplink and downlink blocks with the given downlink and uplink schedulers. It thus has to be decided which timeslots the channel utilization function may assign to the uplink and downlink TBF in order to minimize "collisions" for EFTA mobile station 120.

For example, a downlink TBF's timeslot configuration may comprise 8 timeslots on timeslots 0, 1, 2, 3, 4, 5, 6 and 7 and the mobile station 120 may be capable of managing 8 timeslots downlink and 4 timeslots uplink simultaneously. The given downlink scheduler schedules timeslots starting from low Timeslot Numbers (TN0) up to high timeslot numbers (TN7). The uplink scheduler transmits uplink blocks starting from high timeslot numbers (TN7) down to low timeslot numbers (TN0).

Also, when the timeslots are reserved there is also the question in which order to use them. All uplink timeslots may not be used in every TTI and thus the order in which the timeslots are used may provide certain advantage. When the uplink and downlink is connected due to collisions, the order which the timeslots are used may significantly influence the performance on the downlink. For example, if only one timeslot is to be sent on the uplink during a TTI for a 5 plus 4 reservation (Ttx=Trx=1), either 0, 1, 2 or 3 downlink timeslots may be destroyed due to collision.

Trx is here denoting the switching time from transmitting to receiving while Ttx is denoting the switching time from receiving to transmitting.

If the uplink timeslots that are used when a certain amount of data is sent are chosen appropriately, the collision risk may be completely eliminated, minimized or at least somewhat reduced. Embodiments of the present methods aim at prioritizing the uplink timeslots in order to improve downlink performance.

Based on any, some or all of the following four inputs, a method may improve the performance for a packet session, according to some embodiments:
1. A given downlink TBF's timeslot configuration.
2. A downlink scheduler working in a pre-defined way.
3. An uplink scheduler which transmits uplink blocks in a given timeslot order.
4. The multi-slot class of mobile stations 120.

This may be further described as either a formula or a number of two-dimensional tables with an uplink timeslot configuration as output, and where bullet 2 and 3 above is consistently assumed.

One table may be used per multi-slot class according to some embodiments. This leaves two inputs: current downlink TBF's timeslot configuration and the multi-slot class of the mobile station 120.

Embodiments of the present methods may comprise a number of considerations. It may be noted that some of the enumerated considerations are comprised only within some embodiments. Further, the considerations may be performed in another order than the order of appearance indicates according to some embodiments, such that some considerations may be performed simultaneously, or in a somewhat different, modified or even reversed order.

Depending on how the uplink is used compared with the downlink, the efficiency of EFTA changes. By scheduling the uplink timeslots for the TBF in the disclosed order, the efficiency increases.

The efficiency of an uplink reservation may be dependent on how the timeslots are positioned in relation to the downlink timeslots. The order in which the uplink timeslots are to be scheduled may be derived as follows:

$d$=number of assigned downlink timeslots.
$u$=number of assigned uplink timeslots.
$d>=u$, i.e. the number of assigned downlink timeslots is bigger than or equal to the number of assigned uplink timeslots.
$x$=timeslot number where downlink transmission starts.

Timeslot calculations may be performed modulo 8. Modulo 8 calculation means that enumeration is made up to 8 and then starts from 1 again at the ninth enumeration. Consecutive timeslots are beneficial to use since it may reduce or minimize the number of direction changes. As a consequence, consecutive downlink timeslots and/or consecutive uplink timeslots are preferred.

TN0 or TN7 may be used for frequency change if frequency hopping is used. Direction may be changed during the same timeslots as frequency is changed.

Consecutive timeslots may be determined without using modulo 8. The starting timeslot number in a TBF may be the one closest to TN(0), the ending timeslot number may be the one closest to TN(7).

The minimum number of lost downlink blocks due to collisions of downlink timeslots by uplink timeslots and may be written as:

There are eight timeslots to share for uplink, downlink, Trx and Ttx (frequency hop switching is supposed to be combined with Trx or Ttx). For EFTA the sum of the components may be larger than 8, and the loss is taken by the downlink. This loss is referred to as the downlink loss (dl_loss).

$8+dl\_loss \geq d+u+Trx+Ttx$, $dl\_loss \geq 0$, $u>0$, $d>0$
$<=>$
$dl\_loss = max(0, d+u+Trx+Ttx-8)$, $u>0$, $d>0$ Furthermore, $u=1$: uplink timeslot number $(x+4-Trx) =>$ smallest possible dl_loss.

Trx=1:
  no dl_loss for $d \leq 5$
  1 dl_loss for $d=6$
  2 dl_losses for $d=7$
  3 dl_losses for $d=8$ Trx=0
  no dl_loss for $d \leq 6$
  1 dl_loss for $d=7$
  2 dl_losses for $d=8$ Each additional uplink timeslots on a timeslot number lower than timeslot number (x+4−Trx) increases the dl_loss by a maximum of 1 timeslot.

Uplink timeslot number (x+5−Trx) may destroy downlink timeslot number (x+8)=TN(x).

As a consequence, start selecting timeslot number (x+4−Trx) and then decrease timeslot number until no lower timeslot number is available, then select timeslot number (x+5−Trx) and then increase timeslot number up to the highest available timeslot number.

The conclusion is:

uplink timeslots may be used in the following order:

[x+4−Trx down to 0, x+5−Trx up to 7].

The resulting algorithm for selecting timeslots for EFTA assignments may then comprise:

A. Select as many downlink timeslots as possible according to mobile station multi-slot class parameter Rx and availability while preferring consecutive timeslots.

B. Select as many uplink timeslots as possible according to mobile station multi-slot class parameter Tx and availability in descending timeslot number order starting from timeslot number ((lowest TN downlink)+4−Trx) while preferring consecutive timeslots.

C. Continue select as many uplink timeslots as possible according to mobile station multi-slot class parameter Tx and availability in ascending timeslot numbers order starting from timeslot number ((lowest TN downlink)+5−Trx) while preferring consecutive timeslots.

Dynamic Allocation Uplink RLC Data Block Transfer

This sub-clause specifies mobile station behaviour for dynamic allocation uplink Radio Link Control (RLC) data block transfer while in packet transfer mode, Medium Access Control (MAC)-Shared State, or Dual Transfer Mode (MAC-DTM) state.

When the mobile station 120 receives an uplink assignment such as e.g. PACKET UPLINK ASSIGNMENT, MULTIPLE TBF UPLINK ASSIGNMENT, PACKET TIMESLOT RECONFIGURE, MULTIPLE TBF TIMESLOT RECONFIGURE or PACKET CS RELEASE INDICATION message, that does not contain a TBF starting time, if the uplink TBF is assigned in Basic Transmission Time Interval (BTTI) configuration the mobile station 120 may begin monitoring the downlink Packet Data CHannel (PDCHs) corresponding to, i.e. with the same timeslot number as, the assigned uplink PDCHs for the assigned Uplink State Flag (USF) value for each assigned uplink PDCH within the reaction time. Alternatively, if the uplink TBF is assigned in Reduced Transmission Time Interval (RTTI) configuration, the mobile station 120 may begin monitoring the downlink PDCH-pairs corresponding to the assigned uplink PDCH-pairs for the assigned USF value within the reaction time. If a TBF starting time information element is present and no uplink TBFs are in progress, but one or more downlink TBFs are in progress, the mobile station 120 may wait until the starting time before beginning to monitor the USFs and using the newly assigned uplink TBF parameters. While waiting for the starting time, the mobile station 120 may monitor the assigned downlink PDCHs. If a TBF starting time information element is present and one or more uplink TBFs are already in progress, the mobile station 120 may continue to use the assigned parameters of the ongoing uplink TBFs until the TDMA frame number indicated by the TBF starting time occurs, at which time the mobile station 120 may begin to use the newly assigned uplink TBF parameters. The mobile station 120 may continue to use the newly assigned parameters of each uplink TBF until the TBF is either released or reconfigured. If while waiting for the frame number indicated by the TBF starting time the mobile station 120 receives another uplink assignment, the mobile station 120 may act upon the most recently received uplink assignment and may ignore the previous uplink assignment.

If a mobile station 120 has requested multiple uplink TBFs in a PACKET RESOURCE REQUEST message, the network node 110 may allocate resources for these TBFs by sending one or more uplink assignment messages in response. The mobile station 120 may act upon each successive uplink assignment message as it is received.

A mobile station 120 that has a TBF operating in BTTI configuration may monitor all the downlink PDCHs corresponding to the assigned uplink PDCHs. When operating a TBF in RTTI configuration, the mobile station 120 may monitor the corresponding downlink PDCH-pairs associated with the assigned uplink PDCH-pairs that may be monitored according to the number of allocated uplink PDCH-pairs and its multi-slot capabilities.

Whenever the mobile station 120 detects an assigned USF value on a monitored downlink PDCH or PDCH-pair, the mobile station 120 may transmit either a single Radio Link Control/Medium Access Control (RLC/MAC) block or a sequence of four RLC/MAC blocks on the same PDCH or corresponding PDCH-pair for that TBF except if that TBF is running in extended uplink TBF mode, in which case the mobile station 120 may transmit RLC/MAC block(s) for other TBFs assigned on the same PDCH or corresponding PDCH-pair. The time relation between an uplink block, which the mobile station 120 may use for transmission, and the occurrence of the USF value may be predefined. The number of RLC/MAC blocks to transmit may be controlled by the USF_GRANULARITY parameter characterising the uplink TBF.

If a mobile station 120 with an uplink TBF for which EFTA is used also has one or more concurrent downlink TBF(s), but does not have enough RLC/MAC blocks ready for transmission to fully utilize the total number of allocated resources for uplink radio block transmission during the corresponding radio block period(s), then it may begin monitoring its assigned downlink PDCHs or PDCH-pairs after transmitting its last available RLC/MAC block taking into account the switching requirements of its multi-slot class. In such case, transmissions may be performed on the uplink PDCHs allocated by the USF in the order as specified herein.

An uplink TBF operating in RTTI configuration may receive the assigned USFs either in RTTI USF mode or BTTI USF mode. The USF mode may be indicated during the assignment of the corresponding uplink TBF.

For an uplink TBF in RTTI configuration that receives the USFs in BTTI USF mode:

An assigned USF received on the first PDCH of a monitored downlink PDCH-pair may allocate resources for one or four uplink RTTI radio blocks in the first two TDMA frames of the following basic radio block period(s) on the corresponding uplink PDCH-pair, depending on the value of USF_GRANULARITY.

An assigned USF received on the second PDCH of a monitored downlink PDCH-pair may allocate resources for one or four uplink RTTI radio blocks in the second two TDMA frames of the following basic radio block period(s) on the corresponding uplink PDCH-pair, depending on the value of USF_GRANULARITY.

For an uplink TBF in RTTI configuration that receives the USFs in RTTI USF mode:

An assigned USF received on a monitored downlink PDCH-pair in the first reduced radio block period of a given basic radio block period may allocate resources for one or four uplink RTTI radio blocks in the second reduced radio block period starting in the same basic radio block period and continuing with the second reduced radio block period in the following basic radio block periods on the corresponding uplink PDCH-pair, depending on the value of USF_GRANULARITY.

An assigned USF received on a monitored downlink PDCH-pair in the second reduced radio block period of a given basic radio block period may allocate resources for one or four uplink RTTI radio blocks in the first reduced radio block period starting in the next basic radio block period and continuing with the first reduced radio block period in the following basic radio block periods on the corresponding uplink PDCH-pair, depending on the value of USF_GRANULARITY.

In a Downlink Dual Carrier configuration, one or more PDCHs may be assigned to a single mobile station 120 on each of two different radio frequency channels. A mobile station 120 with a Downlink Dual Carrier configuration may not be allocated radio blocks on both radio frequency channels during any given radio block period.

When the mobile station 120 transmits an RLC/MAC block to the network node 110, it may start a timer, such as e.g. timer T3180 for the uplink TBF on which the block was sent. When the mobile station 120 detects an assigned USF value on a downlink PDCH corresponding to an assigned uplink PDCH for that TBF, the mobile station 120 may restart the timer, such as e.g. the timer T3180. If any given timer, such as e.g. timer T3180 expires, the mobile station 120 may perform an abnormal release with access retry.

Whenever the network node 110 receives a valid RLC/MAC block for any given TBF, it may reset a counter, such as e.g. counter N3101 for that TBF. The network node 110 may increment the counter, such as e.g. the counter N3101 for each radio block, allocated to that TBF, for which no data is received. If N3101=N3101max, a threshold value, the network node 110 may stop the scheduling of RLC/MAC blocks for that TBF and start a second timer, such as e.g. timer T3169. When the second timer, such as e.g. timer T3169 expires, the network node 110 may reuse the USF and TFI assigned to that TBF. If Packet Switched (PS) handover is ongoing, it may not be compulsory for the network node 110 to increment the counter, such as e.g. the counter N3101, according to some embodiments.

Uplink PDCH Allocation

The PACKET UPLINK ASSIGNMENT and MULTIPLE TBF UPLINK ASSIGNMENT messages assign to the mobile station 120 a subset of 1 to N uplink PDCHs (when the uplink TBF operates in BTTI configuration) or uplink PDCH-pairs (when the uplink TBF operates in RTTI configuration), where N depends, or is based, on the mobile station multi-slot class.

An uplink TBF that operates in RTTI configuration may receive the assigned USFs either in BTTI USF mode or in RTTI USF mode. The indication of whether BTTI USF mode or RTTI USF mode is to be used is provided during the assignment of the corresponding uplink TBF.

If a mobile station 120 supports Downlink Dual Carrier, the PACKET UPLINK ASSIGNMENT or MULTIPLE TBF UPLINK ASSIGNMENT message may assign PDCHs (corresponding to any given uplink TBF) on more than one carrier frequency. If this occurs, the Extended Dynamic Allocation procedures may operate independently on each of the two carriers.

The mobile station 120 when it has an uplink TBF operating in BTTI configuration may monitor the downlink PDCHs corresponding to (i.e. with the same timeslot number as) its assigned uplink PDCHs starting with the lowest numbered PDCH, then the next lowest numbered PDCH, etc. up to the one corresponding to the highest numbered assigned uplink PDCH. The mobile station 120 when it has an uplink TBF operating in RTTI configuration may monitor the downlink PDCH-pairs starting with the one corresponding to the uplink PDCH-pair with the lowest numbered timeslots, then the next uplink PDCH-pair etc. up to the downlink PDCH-pair corresponding to the uplink PDCH-pair with the highest numbered timeslots assigned to the mobile station 120. When in dual transfer mode, the network node 110 may not assign uplink PDCHs whose corresponding downlink PDCH cannot be monitored by the mobile station 120 because of the presence of the uplink dedicated channel. As an exception, in the case of dual transfer mode, if the mobile station 120 indicates support of DTM high multi-slot class capability, the network node 110 may also assign uplink PDCHs whose corresponding downlink PDCH cannot be monitored by the mobile station 120. In this case, the mobile station 120 may monitor only those downlink PDCHs that are feasible when taking into account the position of the uplink dedicated channel and the switching requirements of its multi-slot class.

Whenever a mobile station 120 with an uplink TBF operating in BTTI configuration detects an assigned USF value on a monitored PDCH, the mobile station 120 may transmit either a single RLC/MAC block or a sequence of four RLC/MAC blocks on the corresponding uplink PDCH (i.e. with the same timeslot number as the downlink PDCH on which the USF was detected) and all higher numbered assigned uplink PDCHs. If a mobile station 120 with an uplink TBF operating in BTTI configuration for which EFTA is used also has one or more concurrent downlink TBF(s), but does not have enough RLC/MAC blocks ready for transmission to fully utilize the total number of allocated resources for uplink radio block transmission during the corresponding radio block period(s), then it may begin monitoring its assigned downlink PDCHs after transmitting its last available RLC/MAC block taking into account the switching requirements of its multi-slot class. In such case, transmissions may be performed on the uplink PDCHs allocated by the USF in the order as specified herein. The following applies for an uplink TBF in RTTI configuration that receives USFs in BTTI USF mode:

An assigned USF received on the first PDCH of a monitored downlink PDCH-pair may allocate resources for one or four uplink RTTI radio blocks in the first two TDMA frames of the following basic radio block period(s) on the corresponding uplink PDCH-pair and all assigned uplink PDCH-pairs with higher numbered timeslots.

An assigned USF received on the second PDCH of a monitored downlink PDCH-pair may allocate resources for one or four uplink RTTI radio blocks in the second two TDMA frames of the following basic radio block period(s) on the corresponding uplink PDCH-pair and all assigned uplink PDCH-pairs with higher numbered timeslots.

The following may apply for an uplink TBF in RTTI configuration that receives USFs in RTTI USF mode:

An assigned USF received in the first reduced radio block period of a given basic radio block period on a monitored downlink PDCH-pair allocates resources for one or four uplink RTTI radio blocks in the second reduced radio block period starting in the same basic radio block period and continuing with the second reduced radio block period in the following basic radio block periods, depending on the USF granularity, on the corresponding uplink PDCH-pair and all assigned uplink PDCH-pairs with higher numbered timeslots.

An assigned USF received in the second reduced radio block period of a given basic radio block period on a monitored downlink PDCH-pair may allocate resources for one or four uplink RTTI radio blocks in the first reduced radio block period starting in the next basic radio block period and continuing with the first reduced radio block period in the following basic radio block periods, depending on the USF granularity, on the corresponding uplink PDCH-pair and all assigned uplink PDCH-pairs with higher numbered timeslots.

If an uplink TBF in RTTI configuration for which EFTA is used, where the mobile station 120 also has one or more concurrent downlink TBF(s), receives USFs in either BTTI or RTTI USF mode, but the mobile station 120 does not have enough RLC/MAC blocks ready for transmission to fully utilize the total number of allocated resources for uplink radio block transmission during the corresponding radio block period(s), then it may begin monitoring its assigned downlink PDCH-pairs after transmitting its last available RLC/MAC block taking into account the switching time requirements of its multi-slot class. In such case, transmissions may be performed on the uplink PDCH-pairs allocated by the USF in the order as specified herein.

The number of RLC/MAC blocks to transmit on each allocated uplink PDCH/PDCH-pair may be controlled by the USF_GRANULARITY parameter characterising the uplink TBF. The mobile station 120 may, in either BTTI or RTTI configuration, ignore the USF on those higher numbered PDCHs or PDCH-pairs with higher numbered timeslots during the block period where the assigned USF value is detected according to some embodiments. In addition, if USF_GRANULARITY is set to four blocks allocation, it may ignore the USF on all other PDCHs/PDCH-pairs during the first three block periods in which the mobile station 120 has been granted permission to transmit. The USF corresponding to the last three blocks of a four blocks allocation may be set to an unused value for each PDCH/PDCH-pair on which the mobile station has been granted permission to transmit, according to some embodiments.

The mobile station 120 may, during a basic or reduced radio block period in which it has been granted permission to transmit, monitor the assigned USF on the downlink PDCHs/PDCH-pairs corresponding to its assigned uplink PDCHs/PDCH-pairs starting with the lowest numbered PDCH or PDCH-pair with the lowest numbered timeslots up to the highest numbered PDCH or PDCH-pair with the highest numbered timeslots which the mobile station 120 is able to monitor, taking into account the PDCHs/PDCH-pairs allocated for transmission in the basic or reduced radio block period and the switching requirements of the mobile station multi-slot class.

If the network node 110 wishes to reduce the number of PDCHs/PDCH-pairs allocated to a mobile station 120 per basic/reduced radio block period, the network node 110 may do so according to some embodiments, provided that this is compatible with the mobile station's ability to monitor the assigned USF in the downlink PDCH/PDCH-pairs corresponding to the lowest numbered uplink PDCH or PDCH-pair with the lowest numbered timeslots in the new allocation. Otherwise, the network node 110 may not allocate any resources to that mobile station 120 for one basic/reduced radio block period following the basic/reduced radio block period with the higher number of PDCHs/PDCH-pairs allocated.

During the downlink block period where an uplink basic/reduced TTI radio block is allocated on a PDCH/PDCH-pair via the polling mechanism, the mobile station 120 may monitor the assigned USF on the downlink PDCHs/PDCH-pairs corresponding to its assigned uplink PDCHs/PDCH-pairs starting with the lowest numbered PDCH or PDCH-pair with the lowest numbered timeslots up to the highest numbered PDCH or PDCH-pair with the highest numbered timeslots which is feasible when taking into account the PDCHs/PDCH-pairs allocated for transmission in the basic/reduced radio block period and the switching requirements of the mobile station multi-slot class.

For an uplink TBF in BTTI configuration, transmissions may according to some embodiments be performed on the uplink PDCHs allocated by the USF in the timeslot number order TN=(d+4−Trx, d+3−Trx, . . . , 0, d+5−Trx, d+6−Trx, . . . , 7), which is illustrated in Table 1 below. Here, d is used to denote the lowest numbered downlink timeslot the mobile station 120 needs to monitor, whereas Trx is the switching time from transmission to reception.

TABLE 1

| Lowest Downlink Timeslot The MS Needs to Monitor | $T_{rx}$ - ($T_{ra}$ or $T_{rb}$ whichever is applicable) | | | | |
|---|---|---|---|---|---|
| | 0 | 1 | 2 | 3 | 4 |
| 0 | 4, 3, 2, 1, 0, 5, 6, 7 | 3, 2, 1, 0, 4, 5, 6, 7 | 2, 1, 0, 3, 4, 5, 6, 7 | 1, 0, 2, 3, 4, 5, 6, 7 | 0, 1, 2, 3, 4, 5, 6, 7 |
| 1 | 5, 4, 3, 2, 1, 0, 6, 7 | 4, 3, 2, 1, 0, 5, 6, 7 | 3, 2, 1, 0, 4, 5, 6, 7 | 2, 1, 0, 3, 4, 5, 6, 7 | 1, 0, 2, 3, 4, 5, 6, 7 |
| 2 | 6, 5, 4, 3, 2, 1, 0, 7 | 5, 4, 3, 2, 1, 0, 6, 7 | 4, 3, 2, 1, 0, 5, 6, 7 | 3, 2, 1, 0, 4, 5, 6, 7 | 2, 1, 0, 3, 4, 5, 6, 7 |
| 3 | 7, 6, 5, 4, 3, 2, 1, 0 | 6, 5, 4, 3, 2, 1, 0, 7 | 5, 4, 3, 2, 1, 0, 6, 7 | 4, 3, 2, 1, 0, 5, 6, 7 | 3, 2, 1, 0, 4, 5, 6, 7 |
| 4 | 7, 6, 5, 4, 3, 2, 1, 0 | 7, 6, 5, 4, 3, 2, 1, 0 | 6, 5, 4, 3, 2, 1, 0, 7 | 5, 4, 3, 2, 1, 0, 6, 7 | 4, 3, 2, 1, 0, 5, 6, 7 |
| 5 | 7, 6, 5, 4, 3, 2, 1, 0 | 7, 6, 5, 4, 3, 2, 1, 0 | 7, 6, 5, 4, 3, 2, 1, 0 | 6, 5, 4, 3, 2, 1, 0, 7 | 5, 4, 3, 2, 1, 0, 6, 7 |
| 6 | 7, 6, 5, 4, 3, 2, 1, 0 | 7, 6, 5, 4, 3, 2, 1, 0 | 7, 6, 5, 4, 3, 2, 1, 0 | 7, 6, 5, 4, 3, 2, 1, 0 | 6, 5, 4, 3, 2, 1, 0, 7 |
| 7 | 7, 6, 5, 4, 3, 2, 1, 0 | 7, 6, 5, 4, 3, 2, 1, 0 | 7, 6, 5, 4, 3, 2, 1, 0 | 7, 6, 5, 4, 3, 2, 1, 0 | 7, 6, 5, 4, 3, 2, 1, 0 |

For an uplink TBF in RTTI configuration, the reference to the timeslot number TN above may in this case rather be interpreted as the lowest numbered timeslot of the PDCH-pair.

"Tra" mentioned in Table 1 relates to the time utilized for the mobile station 120 to perform adjacent cell signal level measurement and get ready to receive.

For a type 1 mobile station 120 it may be the minimum number of timeslots that will be allowed between the previous transmit or receive timeslot and the next receive timeslot when measurement is to be performed between.

For a type 2 mobile station 120 it may be the minimum number of timeslots that will be allowed between the end of the last receive burst in a frame and the first receive burst in the next frame.

"Trb" relates to the time utilized for the mobile station 120 to get ready to receive. This minimum requirement may be utilized when adjacent cell power measurements are not required by the service selected.

For type 1 mobile station 120 it may be the minimum number of timeslots that will be allowed between the previous transmit timeslot and the next receive timeslot or between the previous receive timeslot and the next receive timeslot when the frequency is changed in between.

For type 2 mobile station 120 it may be the minimum number of timeslots that will be allowed between the end of the last receive burst in a frame and the first receive burst in the next frame.

Figure 3:
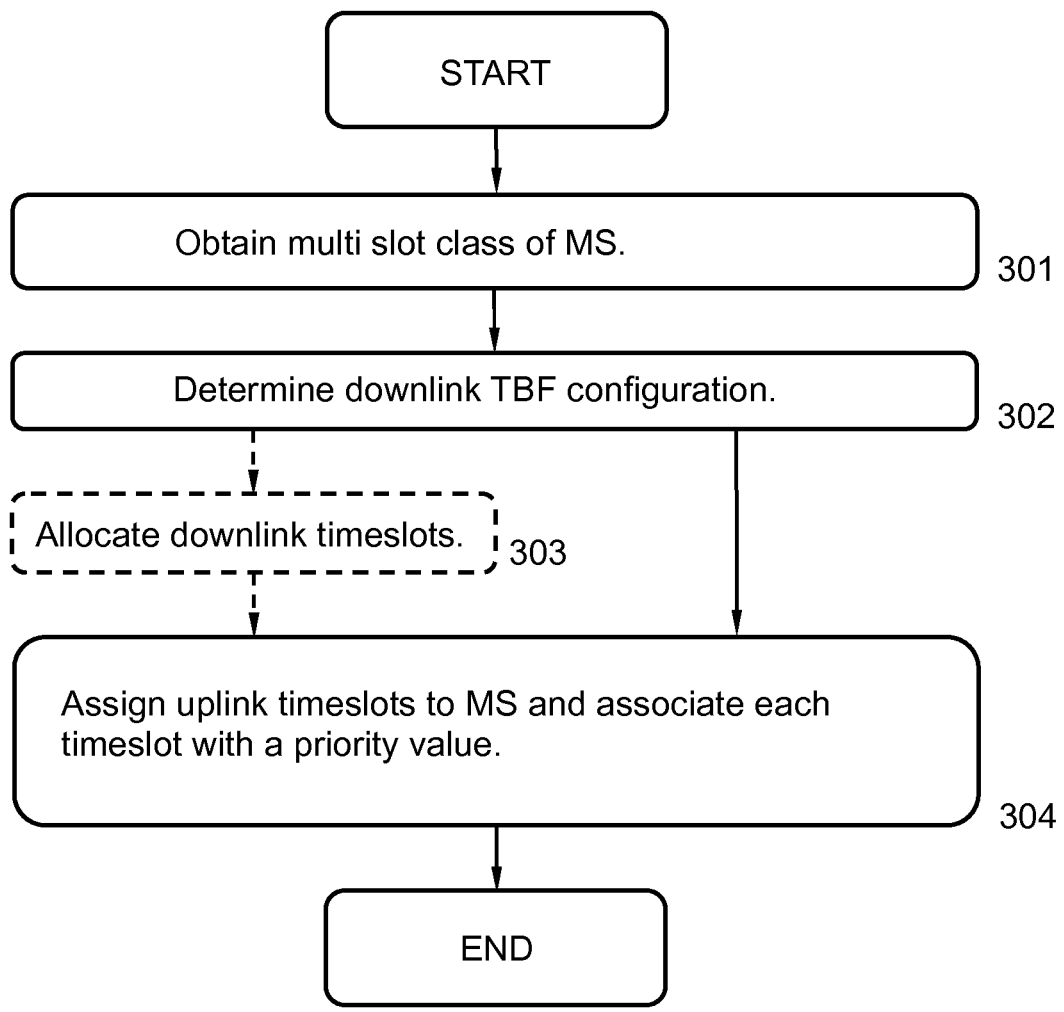
FIG. 3 is a schematic block diagram illustrating a method in a network node in a wireless communication system according to some embodiments.

FIG. 3 is a schematic block diagram illustrating an embodiment of the present method in a network node 110, regarded in perspective of the network node 110. The network node 110 may be represented by a base station or the like. The method aims at scheduling wireless transmissions between the network node 110 and a mobile station 120. The network node 110 and the mobile station 120 are comprised in a wireless communication system 100, wherein the network node 110 may act as serving base station for the mobile station 120.

The method may comprise a number of actions 301-304, in order to efficiently schedule wireless transmissions within the wireless communication system 100. The actions may be performed in a somewhat different chronological order than the enumeration indicates, according to different embodiments. Further, it is to be noted that some of the actions, indicated by dashed lines in FIG. 3, are comprised within some alternative embodiments. Any, some or all actions, such as e.g. 302 and 303 may be performed simultaneously or in a rearranged chronological order. The method may comprise the following actions:

Action 301

A multi-slot class of the mobile station 120 is obtained.

Action 302

A downlink Temporary Block Flow configuration is determined.

Action 303

This action may be performed within some alternative embodiments.

As many downlink timeslots as possible may be assigned, based on the obtained multi-slot class of the mobile station 120, according to some embodiments.

The assignment of downlink timeslots may according to some embodiments be made with consecutive downlink timeslots.

An advantage with assigning downlink timeslots consecutively is that the number of switches between uplink and downlink is reduced. As each switch between uplink and downlink take some time to accomplish, time is saved, which leads to a higher system throughput, better utilization of available resources and improved performance within the wireless communication system 100.

Action 304

Uplink timeslots are assigned to the mobile station 120. Each assigned uplink timeslot is associated with a priority value, based on the downlink Temporary Block Flow configuration and the multi-slot class of the mobile station 120.

An advantage when assigning uplink timeslots to the mobile station 120 based on the downlink Temporary Block Flow configuration and the multi-slot class of the mobile station 120, is that the probability of having colliding downlink and uplink timeslots reduced, or even eliminated.

The assignment of uplink timeslots to the mobile station 120 may be made with consecutive uplink timeslots according to some embodiments.

An advantage with assigning uplink timeslots consecutively is that the number of switches between uplink and downlink is reduced. As each switch between uplink and downlink take some time to accomplish, time is saved, which leads to a higher system throughput, better utilization of available resources and improved performance within the wireless communication system 100.

As many uplink timeslots as possible may according to some embodiments be selected, based on the obtained multi-slot class of the mobile station 120, in a priority order in descending timeslot number order down to timeslot 0, starting from the timeslot number computed by the following algorithm: the lowest timeslot number assigned to downlink transmission plus 4 minus the number of timeslots it takes to switch from transmission to reception, maximum 7 timeslots.

The following sub-actions may be performed according to some embodiments:

determine the lowest timeslot number assigned to downlink transmission, add four to the determined timeslot number, establish the number of timeslots it takes to switch from transmission to reception, subtract the established number of timeslots from the previously calculated sum, fix a first uplink timeslot to be assigned to the mobile station 120 by computing the final sum of the above parameter values, select the next descending timeslot number for the next uplink timeslot to be assigned to the mobile station 120, down to timeslot 0.

According to some embodiments, as many uplink timeslots as possible may be selected, based on the obtained multi-slot class of the mobile station 120, in a priority order in ascending timeslot number order up to timeslot 7, starting from the timeslot number computed by the following algorithm: the lowest timeslot number assigned to downlink transmission plus 5 minus the number of timeslots it takes to switch from transmission to reception, maximum 7 timeslots.

According to those embodiments, the following sub-actions may be performed:

determine the lowest timeslot number assigned to downlink transmission, add five to the determined timeslot number, establish the number of timeslots it takes to switch from transmission to reception, subtract the established number of timeslots from the previously calculated sum, fix a first uplink timeslot to be assigned to the mobile station 120 by computing the final sum of the above parameter values, select the next ascending timeslot number for the next uplink timeslot to be assigned to the mobile station 120, up to timeslot 7.

As many uplink timeslots as possible may be selected from a table, such as exemplified in e.g. Table 1, which table in turn may have been constructed based on any or both of the above disclosed algorithms according to some embodiments.

The table may be stored in a memory device such as a memory, database or any other convenient means for storing data.

Since the algorithms according to the present methods have two inputs, it may be feasible to implement all combinations e.g. in pre-defined selection tables, or look-up tables as they also may be referred to. This makes it deterministic and fast to select an appropriate configuration, or even the optimal configuration.

Figure 4:
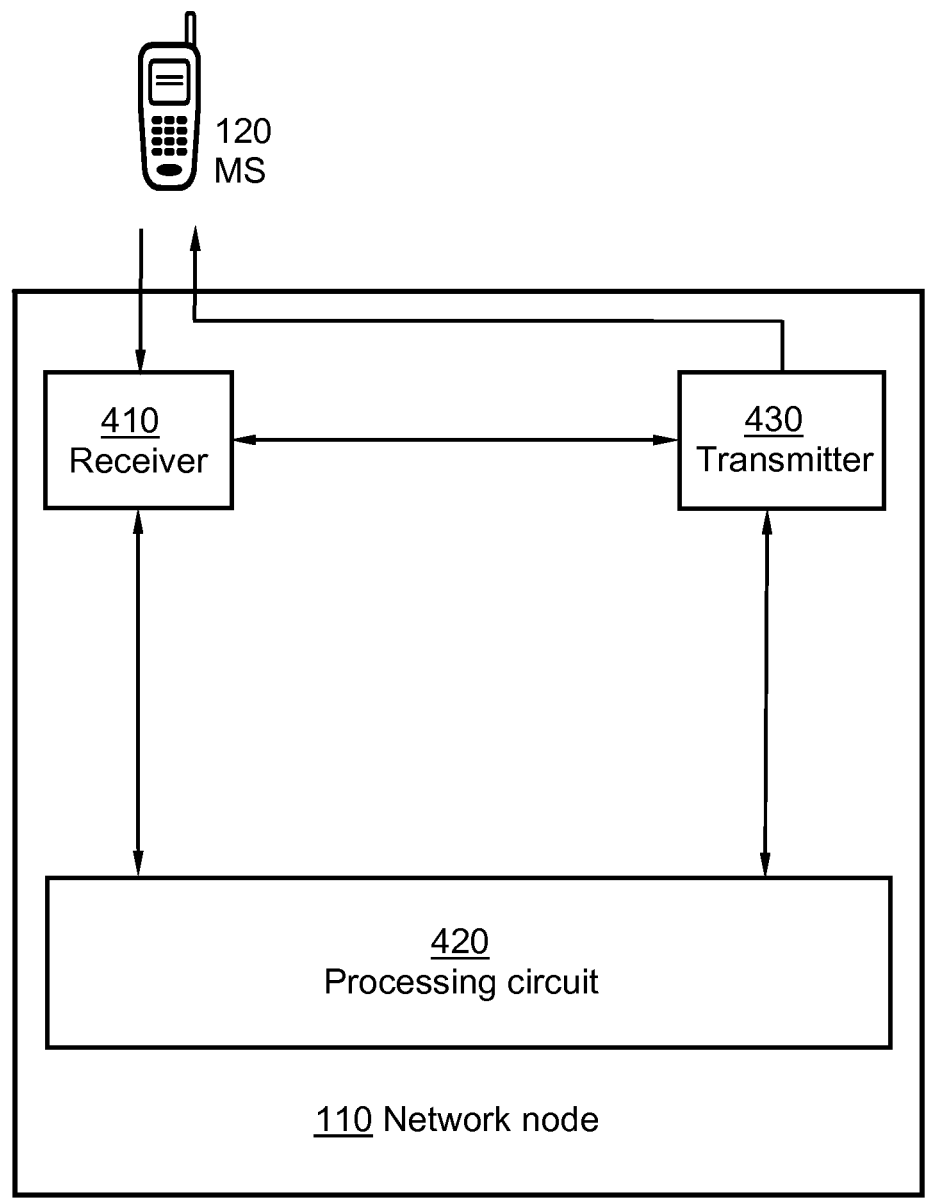
FIG. 4 is a schematic block diagram illustrating a network node in a wireless communication system according to some embodiments.

FIG. 4 is a block diagram illustrating a network node 110. The network node 110 may be represented by a base station or the like, according to some embodiments. The network node 110 is configured to perform any some or all of the actions 301-304 for scheduling wireless transmissions between the network node 110 and a mobile station 120.

For the sake of clarity, any internal electronics or other components of the network node 110, not completely indispensable for understanding the present method has been omitted from FIG. 4.

In order to perform the actions 301-304 correctly, the network node 110 comprises a processing circuit 420. The processing circuit 420 is configured to determine a downlink Temporary Block Flow configuration. Further, the processing circuit 420 is configured to obtain a multi-slot class of the mobile station 120. Additionally, the processing circuit 420 is further configured to assign uplink timeslots to the mobile station 120 and associating each assigned uplink timeslot with a priority value, based on the downlink Temporary Block Flow configuration and the multi-slot class of the mobile station 120.

The processing circuit 420 may comprise e.g. one or more instances of a Central Processing Unit (CPU), a processing unit, a processor, a microprocessor, or other processing logic that may interpret and execute instructions. The processing circuit 420 may further perform data processing functions for inputting, outputting, and processing of data comprising data buffering and device control functions, such as call processing control, user interface control, or the like.

Further, according to some embodiments, the network node 110 may comprise a receiver 410, configured to receive signals from the mobile station 120.

In addition, according to some embodiments, the network node 110 comprises a transmitter 430. The transmitter 430 may be arranged to transmit signals to the mobile station 120, such as e.g. transmit an uplink assignment to the mobile station 120, according to some embodiments.

Further, it is to be noted that some of the described units 410-430 comprised within the network node 110 in the wireless communication system 100 are to be regarded as separate logical entities but not with necessity separate physical entities. To mention just one example, the receiver 410 and the transmitter 430 may be comprised or co-arranged within the same physical unit, a transceiver, which may comprise a transmitter circuit and a receiver circuit, which transmits outgoing radio frequency signals and receives incoming radio frequency signals, respectively, via an antenna. The radio frequency signals transmitted between the network node 110, and the mobile station 120 may comprise both traffic and control signals e.g. paging signals/messages for incoming calls, which may be used to establish and maintain a voice call communication with another party or to transmit and/or receive data, such as SMS, e-mail or MMS messages, with a remote user equipment, or other node comprised in the wireless communication system 100.

The actions 301-304 to be performed in the network node 110 may be implemented through one or more processing circuits 420 in the network node 110, together with computer program code for performing the functions of the present actions 301-304. Thus a computer program product, comprising instructions for performing the actions 301-304 in the network node 110 may schedule wireless transmissions between the network node 110 and a mobile station 120, when being loaded into the one or more processing circuits 420.

The computer program product mentioned above may be provided for instance in the form of a data carrier carrying computer program code for performing at least some of the actions 301-304 according to some embodiments when being loaded into the processing circuit 420. The data carrier may be e.g. a hard disk, a CD ROM disc, a memory stick, an optical storage device, a magnetic storage device or any other appropriate medium such as a disk or tape that may hold machine readable data. The computer program product may furthermore be provided as computer program code on a server and downloaded to the network node 110 remotely, e.g. over an Internet or an intranet connection.

Figure 5:
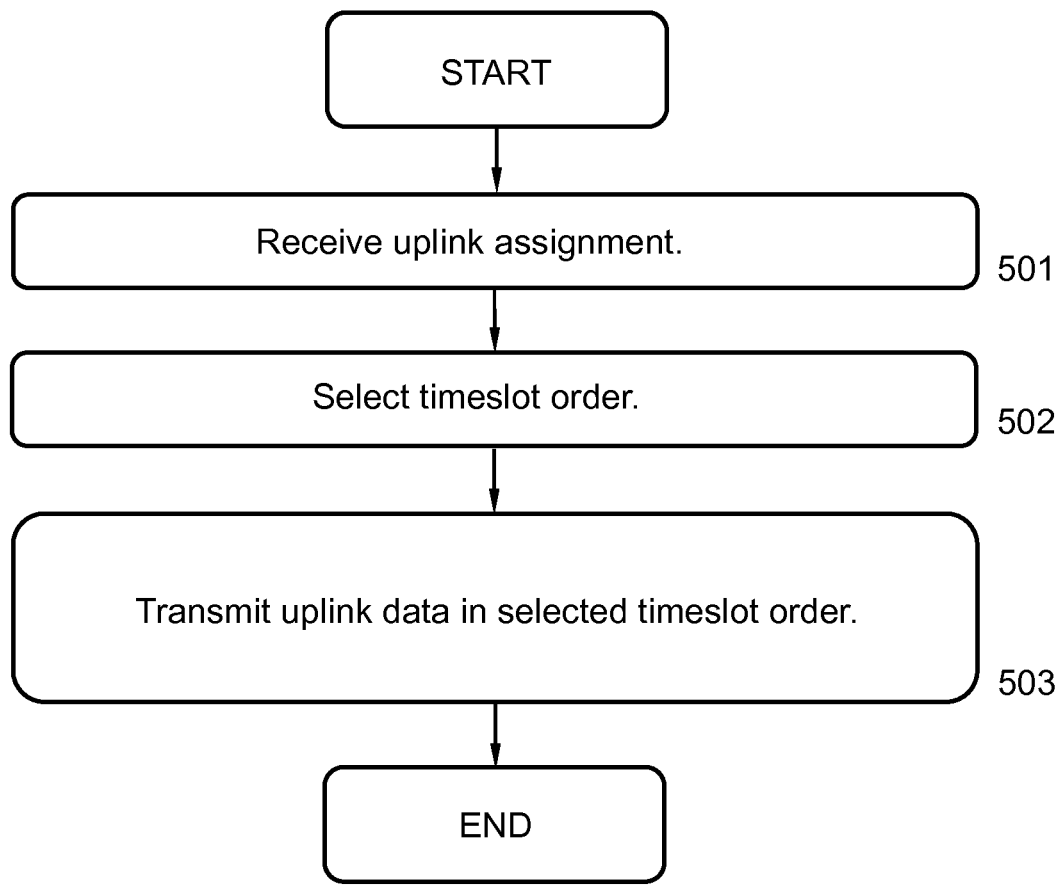
FIG. 5 is a schematic block diagram illustrating a method in a mobile node in a wireless communication system according to some embodiments.

FIG. 5 is a schematic block diagram illustrating an embodiment of the present method in a mobile station 120, regarded in perspective of the mobile station 120. The mobile station 120 may be represented by a user equipment or the like. The method aims at selecting scheduling order for timeslots in uplink transmission of data to a network node 110. The network node 110 and the mobile station 120 are comprised in a wireless communication system 100, wherein the network node 110 may act as serving base station for the mobile station 120.

The method comprises a number of actions 501-503, in order to correctly select timeslots for uplink transmission. The actions may be performed in a somewhat different chronological order than the enumeration indicates, according to different embodiments. Any, some or all actions, such as e.g. 501 and 502 may be performed simultaneously or in a somewhat rearranged chronological order. The method may comprise the following actions:

Action 501

An uplink assignment is received from the network node 110.

The received uplink assignment may comprise a permission to transmit uplink data on a certain resource such as e.g. on uplink PDCH, according to some embodiments, in certain assigned timeslots. Thus the uplink assignment comprises information, informing the mobile station 120, which timeslots that are assigned for uplink transmission, i.e. which timeslots the mobile station 120 is allowed to use for transmission of data to the network node 110.

Each assigned uplink timeslot may be associated with a priority value. The order of the uplink timeslots, i.e. the priority value associated with each assigned timeslot may be implicit, as the order in which the mobile station 120 utilizes the assigned uplink timeslot may be selected by the mobile station 120, i.e. hard coded in a look-up table or similar, such as exemplified e.g. in Table 1.

Action 502

The order, in which timeslots are to be scheduled for uplink transmission is selected, based on an algorithm using the lowest numbered downlink timeslot the mobile station 120 needs to monitor, and the switching time from transmission to reception of the mobile station 120 as parameters.

The switching time from transmission to reception of the mobile station 120 may comprise the time it takes for the mobile station 120 to get ready to receive.

However, the switching time from transmission to reception of the mobile station 120 may according to some alternative embodiments comprise the switching time from transmission to reception added to the switching time from reception to transmission of the mobile station 120, or any of the switching time from transmission to reception or the switching time from reception to transmission of the mobile station 120 according to some embodiments.

The priority order may be in descending timeslot number order down to timeslot 0, starting from the timeslot number computed by the following algorithm, according to some embodiments:

The lowest downlink timeslot number the mobile station 120 needs to monitor plus 4 minus the number of timeslots it takes to switch from transmission to reception, maximum 7 timeslots.

Further, the priority order may be in ascending timeslot number order up to timeslot 7, starting from the timeslot number computed by the following algorithm, according to some embodiments:

The lowest downlink timeslot number the mobile station 120 needs to monitor plus 5 minus the number of timeslots it takes to switch from transmission to reception, maximum 7 timeslots.

The uplink timeslots according to some embodiments may be selected from a look-up table, such as exemplified e.g. in Table 1, which table in turn may have been constructed based on any, or both, of the above disclosed algorithms. The look-up table may be stored in a memory device such as a memory, database or any other convenient means for storing data, and which is comprised within, or accessible for the mobile station 120.

Action 503

Uplink data is transmitted in the selected timeslot order, until there are either no more assigned timeslots available, or no more data to transmit, such that the assigned timeslots that are redundant are not used for uplink transmission. The uplink data is to be received by the network node 110.

The uplink transmission may thereby be performed in priority order of the timeslots according to some embodiments.

Figure 6:
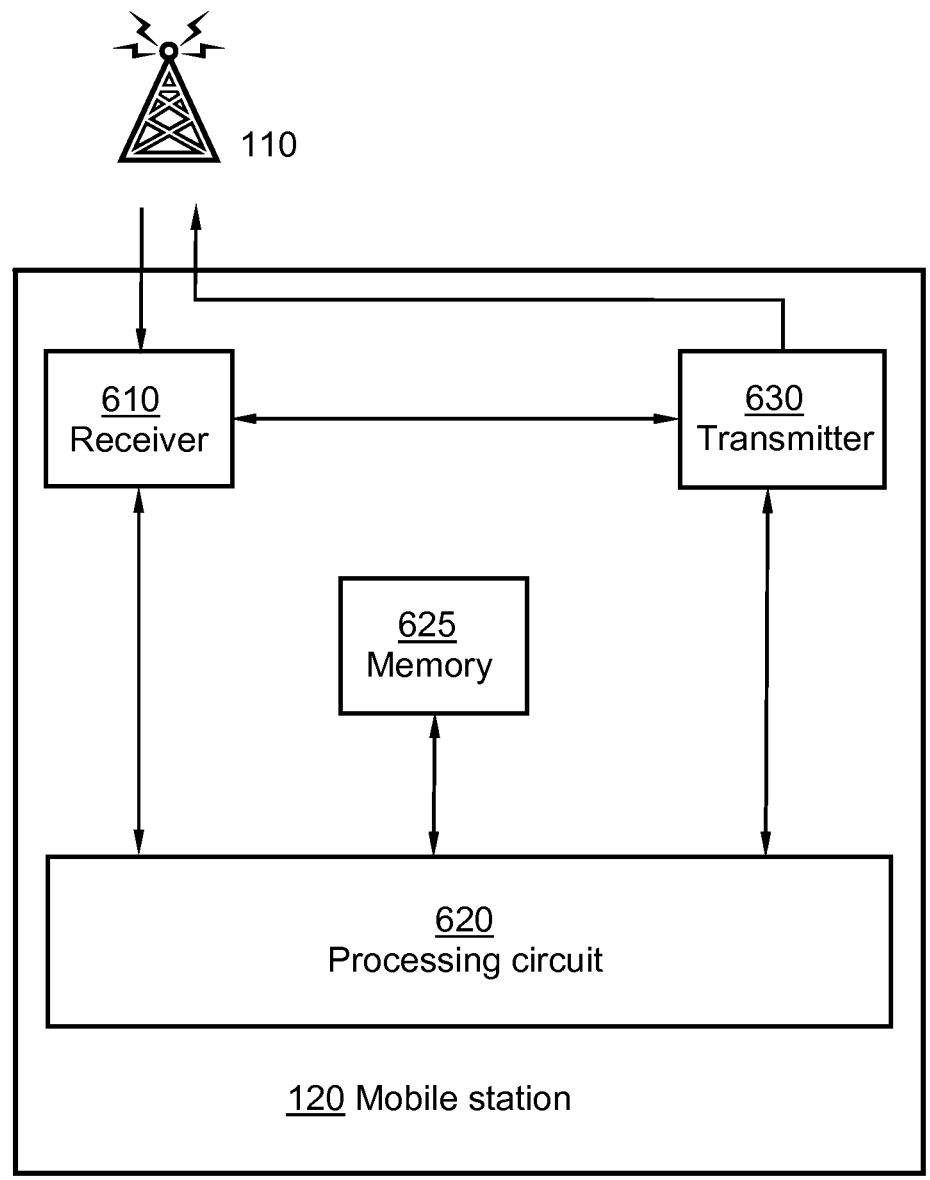
FIG. 6 is a schematic block diagram illustrating a mobile node in a wireless communication system according to some embodiments.

FIG. 6 is a block diagram illustrating a mobile station 120. The mobile station 120 may be represented by e.g. a user equipment or the like. The mobile station 120 is configured to perform any some or all of the actions 501-503 for selecting scheduling order for timeslots in uplink transmission of data to a network node 110.

For the sake of clarity, any internal electronics or other components of the mobile station 120, not completely indispensable for understanding the present method has been omitted from FIG. 6.

In order to perform the actions 501-503 correctly, the mobile station 120 comprises a receiver 610, configured to receive an uplink assignment from the network node 110.

Further, the mobile station 120 comprises a processing circuit 620. The processing circuit 620 may be configured for selecting the order in which timeslots are to be scheduled for uplink transmission, based on an algorithm using the lowest numbered downlink timeslot the mobile station 120 needs to monitor, and the switching time from transmission to reception of the mobile station 120 as parameters. The switching time from transmission to reception of the mobile station 120 may be seen as the time it takes for the mobile station 120 to get ready to receive signals comprising data.

The processing circuit 620 may comprise e.g. one or more instances of a Central Processing Unit (CPU), a processing unit, a processor, a microprocessor, or other processing logic that may interpret and execute instructions. The processing circuit 620 may further perform data processing functions for inputting, outputting, and processing of data comprising data buffering and device control functions, such as call processing control, user interface control, or the like.

Further, the mobile station 120 comprises a transmitter 630. The transmitter 630 is configured for transmitting uplink data in the assigned uplink timeslots, until there are either no more assigned timeslots available, or no more data to transmit, such that the assigned timeslots that are redundant are not used for uplink transmission. The uplink data is to be received by the network node 110.

In addition, the mobile station 120 may according to some embodiments comprise a memory 625 for storing data, configured to store the order in which timeslots are to be scheduled for uplink transmission in a look-up table, such as exemplified e.g. in Table 1.

Further, it is to be noted that some of the described units 610-630 comprised within the mobile station 120 in the wireless communication system 100 are to be regarded as separate logical entities but not with necessity separate physical entities. To mention just one example, the receiver 610 and the transmitter 630 may be comprised or co-arranged within the same physical unit, a transceiver, which may comprise a transmitter circuit and a receiver circuit, which transmits outgoing radio frequency signals and receives incoming radio frequency signals, respectively, via an antenna. The radio frequency signals transmitted between the network node 110, and the mobile station 120 may comprise both traffic and control signals e.g. paging signals/messages for incoming calls, which may be used to establish and maintain a voice call communication with another party or to transmit and/or receive data, such as SMS, e-mail or MMS messages, with a remote user equipment, or other node comprised in the wireless communication system 100.

The actions 501-503 to be performed in the mobile station 120 may be implemented through one or more processing circuits 620 in the mobile station 120, together with computer program code for performing the functions of the present actions 501-503. Thus a computer program product, comprising instructions for performing the actions 501-503 in the mobile station 120 may select timeslots for uplink transmission to a network node 110, when being loaded into the one or more processing circuits 620.

The computer program product mentioned above may be provided for instance in the form of a data carrier carrying computer program code for performing at least some of the actions 501-503 according to some embodiments when being loaded into the processing circuit 620. The data carrier may be e.g. a hard disk, a CD ROM disc, a memory stick, an optical storage device, a magnetic storage device or any other appropriate medium such as a disk or tape that may hold machine readable data. The computer program product may furthermore be provided as computer program code on a server and downloaded to the mobile station 120 remotely, e.g. over an Internet or an intranet connection.

Figure 7:
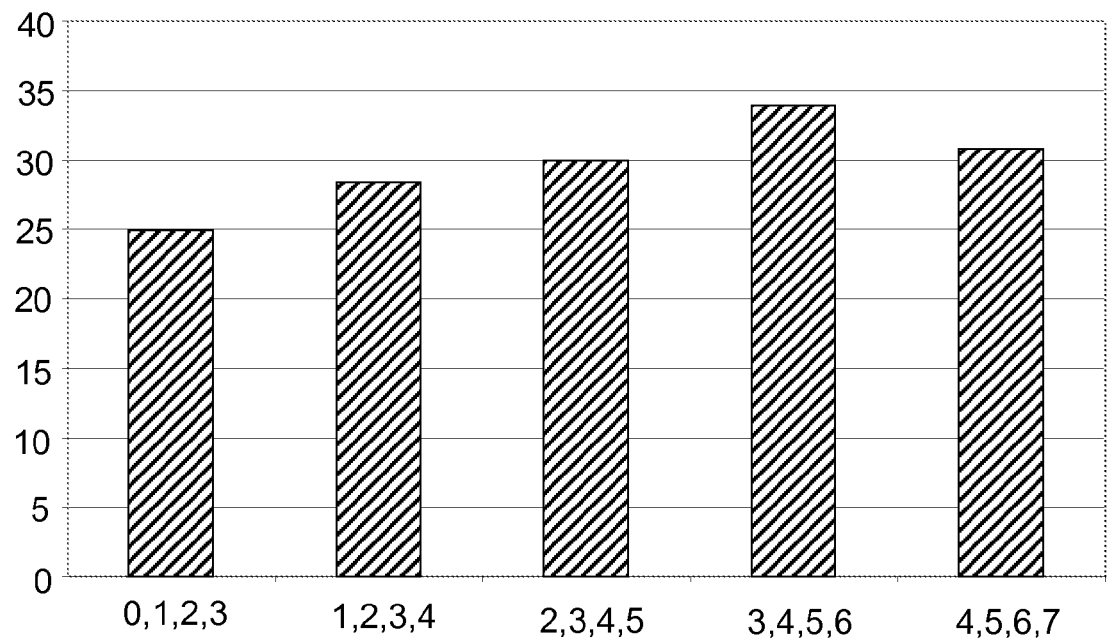
FIG. 7 is a schematic block diagram illustrating the performance of different uplink timeslot configurations according to some embodiments.

FIG. 7 shows an example of the performance difference between different TBF configurations, for a multi-slot class 26 in EFTA mode, i.e. 8 downlink timeslots and 4 uplink timeslots. The difference is shown as performance for the end-user, but may be related to resource efficiency which in turn may be important in order to determine how high capacity the wireless communication system 100 has. As illustrated, the first configuration, comprising timeslots 0, 1, 2 and 3 in the uplink gives the best performance.

The terminology used in the disclosure of the exemplary embodiments illustrated in the accompanying drawings is not intended to be limiting of the present methods and nodes.

As used herein, the singular forms "a", "an" and "the" are intended to comprise the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it may be directly connected or coupled to the other element or intervening elements may be present. Furthermore, "connected" or "coupled" as used herein may comprise wirelessly connected or coupled. As used herein, the term "and/or" includes any and all combinations of one or more of the associated listed items.

What is claimed is:

1. A method in a network node for scheduling wireless transmissions between the network node and a mobile station, the method comprising:
    obtaining a multi-slot class of the mobile station,
    determining a downlink Temporary Block Flow configuration, and
    assigning uplink timeslots to the mobile station and associating each assigned uplink timeslot with a priority value, based on the downlink Temporary Block Flow configuration and the multi-slot class of the mobile station, wherein said assigning and associating comprises selecting as many uplink timeslots as possible, based on the obtained multi-slot class of the mobile station, in a priority order, by selecting uplink timeslots in descending timeslot number order down to timeslot number zero, said selection starting from the lowest timeslot number assigned to downlink transmission, plus four timeslots, minus the number of timeslots it takes to switch from transmission to reception, but in no cases starting from a timeslot number greater than seven.

2. The method according to claim 1, wherein said assigning comprises assigning consecutive uplink timeslots to the mobile station.

3. The method according to claim 1, further comprising assigning as many downlink timeslots to the mobile station as possible, based on the obtained multi-slot class of the mobile station.

4. The method according to claim 3, wherein said assigning as many downlink timeslots to the mobile station as possible comprises assigning as many consecutive downlink timeslots to the mobile station as possible.

5. The method according to claim 1, wherein said assigning and associating comprises selecting as many uplink timeslots as possible, based on the obtained multi-slot class of the mobile station, in a priority order, by selecting uplink timeslots in ascending timeslot number order up to timeslot number seven, said selection starting from the lowest timeslot number assigned to downlink transmission, plus five timeslots, minus the number of timeslots it takes to switch from transmission to reception, but in no cases starting from a timeslot number greater than seven.

6. The method according to claim 1, wherein said assigning comprises selecting as many uplink timeslots as possible from a table.

7. A network node configured to schedule wireless transmissions between the network node and a mobile station, the network node comprising a processing circuit configured to:
    determine a downlink Temporary Block Flow configuration;
    obtain a multi-slot class of the mobile station; and
    assign uplink timeslots to the mobile station and associate each assigned uplink timeslot with a priority value, based on the downlink Temporary Block Flow configuration and the multi-slot class of the mobile station, by selecting uplink timeslots in descending timeslot number order down to timeslot number zero, said selection starting from the lowest timeslot number assigned to downlink transmission, plus four timeslots, minus the number of timeslots it takes to switch from transmission to reception, but in no cases starting from a timeslot number greater than seven.

8. The network node according to claim 7, wherein the processing circuit is configured to assign consecutive uplink timeslots to the mobile station.

9. The network node according to claim 7, wherein the processing circuit is further configured to assign as many downlink timeslots to the mobile station as possible, based on the obtained multi-slot class of the mobile station.

10. The network node according to claim 7, wherein the processing circuit is configured to select as many uplink timeslots as possible, based on the obtained multi-slot class of the mobile station, in a priority order, by selecting uplink timeslots in ascending timeslot number order up to timeslot number seven, said selection starting from the lowest timeslot number assigned to downlink transmission, plus five timeslots, minus the number of timeslots it takes to switch from transmission to reception, but in no cases starting from a timeslot number greater than seven.

11. A method in a mobile station for selecting a timeslot scheduling order for uplink transmission of data to a network node, the method comprising:
    receiving an uplink assignment from the network node,
    selecting the order in which timeslots assigned to the mobile station by said uplink assignment are to be scheduled for uplink transmission, based on a lowest numbered downlink timeslot that the mobile station needs to monitor, and a switching time from transmission to reception of the mobile station, and
    transmitting data in said assigned timeslots in the selected timeslot order, until there are either no more assigned timeslots available or no more data to transmit.

12. The method according to claim 11, wherein said selecting comprises selecting the order from a look-up table that includes a plurality of different candidate orders for different combinations of said lowest numbered downlink timeslot and said switching time.

13. The method according to claim 11, wherein said selected timeslot order orders at least some timeslots in descending timeslot number order down to timeslot number zero, starting from said lowest downlink timeslot number, plus timeslots, minus the number of timeslots associated with said switching time, but in no cases starting from a timeslot number greater than seven.

14. The method according to claim 11, wherein said selected timeslot order orders at least some timeslots in ascending timeslot number order up to timeslot number seven, starting from said lowest downlink timeslot number, plus five timeslots, minus the number of timeslots associated with said switching time, but in no cases starting from a timeslot number greater than seven.

15. A mobile station configured to select a timeslot scheduling order for uplink transmission of data to a network node, the mobile station comprising:
    a receiver configured to receive an uplink assignment from the network node,
    a processing circuit configured to select the order in which timeslots assigned to the mobile station by said uplink assignment are to be scheduled for uplink transmission, based on a lowest numbered downlink timeslot that the mobile station needs to monitor, and a switching time from transmission to reception of the mobile station , and
    a transmitter configured to transmit data in said assigned timeslots in the selected timeslot order, until there are either no more assigned timeslots available or no more data to transmit.

16. The mobile station according to claim 15, further comprising a memory configured to store a look-up table that includes a plurality of different candidate orders for different combinations of said lowest numbered downlink timeslot and said switching time, and wherein the processing circuit is configured to select said order from said look-up table.

17. The mobile station according to claim 15, wherein said selected timeslot order orders at least some timeslots in descending timeslot number order down to timeslot number zero, starting from said lowest downlink timeslot number, plus timeslots, minus the number of timeslots associated with said switching time, but in no cases starting from a timeslot number greater than seven.

18. The mobile station according to claim 15, wherein said selected timeslot order orders at least some timeslots in ascending timeslot number order up to timeslot number seven, starting from said lowest downlink timeslot number, plus five timeslots, minus the number of timeslots associated with said switching time, but in no cases starting from a timeslot number greater than seven.

\* \* \* \* \*